United States Patent [19]

Ermer et al.

[11] 4,378,610
[45] Apr. 5, 1983

[54] DEVICE FOR REMOVING IMPURITIES FROM DATA CARRIERS

[75] Inventors: Wolfgang Ermer, Hirten; Bernd Payrhammer, Munich; Heinz Rapp, Munich; Alois Bauer, Munich, all of Fed. Rep. of Germany

[73] Assignee: Agfa-Gevaert Aktiengesellschaft, Leverkusen, Fed. Rep. of Germany

[21] Appl. No.: 237,600

[22] Filed: Feb. 24, 1981

[30] Foreign Application Priority Data

Feb. 29, 1980 [DE] Fed. Rep. of Germany ....... 3007841
Sep. 9, 1980 [DE] Fed. Rep. of Germany ....... 3033823

[51] Int. Cl.³ .............................................. G03G 21/00
[52] U.S. Cl. .................................... 15/1.5 R; 15/100; 355/15
[58] Field of Search ................. 15/1.5, 256.52, 100; 355/15; 118/652

[56] References Cited

U.S. PATENT DOCUMENTS

| 2,357,809 | 9/1944 | Carlson | 15/1.5 R X |
| 2,751,616 | 6/1956 | Turner, Jr. et al. | 15/1.5 R |
| 2,920,987 | 1/1960 | Landry et al. | 15/1.5 R X |
| 3,706,108 | 12/1972 | Taylor | 15/1.5 R |
| 3,780,391 | 12/1973 | Leenhouts | 15/1.5 R |
| 3,883,292 | 5/1975 | Hamaker | 15/1.5 R X |
| 4,295,239 | 10/1981 | Myochin | 15/1.5 R |

Primary Examiner—Edward L. Roberts
Attorney, Agent, or Firm—Kontler, Grimes & Battersby

[57] ABSTRACT

A device which removes dust and/or other impurities from photographic films, records or other data carriers has one or more brushes whose bristles sweep along the surface or surfaces of a data carrier while the data carrier moves relative to the bristles and/or vice versa. The electrostatic charge which develops as a result of frictional engagement between the data carrier and the bristles is led away by providing each brush with bristles at least some of which consist of conductive material and are grounded via electrodes which contact the tips of the bristles and/or by way of the core of each brush.

27 Claims, 3 Drawing Figures

DEVICE FOR REMOVING IMPURITIES FROM DATA CARRIERS

BACKGROUND OF THE INVENTION

The present invention relates to a device for removing impurities from data carriers, and more particularly to a device for cleaning photographic films, records, magnetic tapes and analogous data carriers which tend to become electrostatically charged due to friction, specifically, as a result of relative movement between the data carrier and a brush which is to remove contaminants, such as dust.

Data carrier cleaning devices are used in numerous machines or apparatus, for example, in photographic copying machines in which original photographic films are copied. In such machines, it is important to remove dust and/or other contaminants before the original is copied; this eliminates scratching of the sensitive film surface and reduces visual blemishes on the copy.

A drawback of conventional data carrier cleaning devices is that friction between the cleaning brush (or brushes) and the film causes the latter to become electrostatically charged which leads, among others, to even more pronounced adherence of dust particles to the film. Therefore, copying machines are often equipped with devices for ionizing the air about the film, or else to humidify this air. Neither approach has been particularly satisfactory. Aside from the fact that the additional devices are expensive, the space in a copying machine is at a premium and, therefore, the presence of ionizing or humidifying devices is objectionable. Also, ionizers generate odors which are likely to be offensive to many persons.

OBJECTS AND SUMMARY OF THE INVENTION

An object of the invention is to provide a novel and improved data carrier cleaning device which obviates the need for equipment to reduce or prevent frictional electrostatic charging of data carriers.

Another object of the invention is to provide a device of the above outlined character wherein electrostatic charges which develop as a result of friction between the moving data carrier and the brush or brushes are immediately destroyed.

The invention is embodied in a device for cleaning data carriers—such as photographic films, sound or video records ("platters"), magnetic tapes and the like—which tend to accumulate friction-induced electrostatic charges. The device comprises one or more brushes adapted to engage the data carrier during movement between the carrier and the brush(es) in order to clean the carrier, with resultant development of a frictional electrostatic charge on the carrier. The brush has a surface section composed of bristles, filaments, fibers, strips of material or the like. At least some of these bristles, filaments, fibers or strips are electrically conductive so that they lead the electrostatic charge away from the carrier as the brush performs its cleaning action upon the carrier. The electrically conductive portions of the surface section are electrically connected to the ground so that the electrostatic charge is immediately dissipated.

The conductive portions may be carbon filaments if they are not to be subjected to any significant mechanical stresses (carbon filaments are brittle). They may also be electrically conductive strips, for example strips consisting of a synthetic plastic material in which electrically conductive particles are embedded in sufficient quantities to make the entire strip conductive.

The novel features which are considered as characteristic of the invention are set forth in particular in the appended claims. The improved device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

The invention will be described with reference to the cleaning of photographic films as the data carriers. However, the improved device can be used with equal advantage for the cleaning of other types of data carriers.

Figure 1:
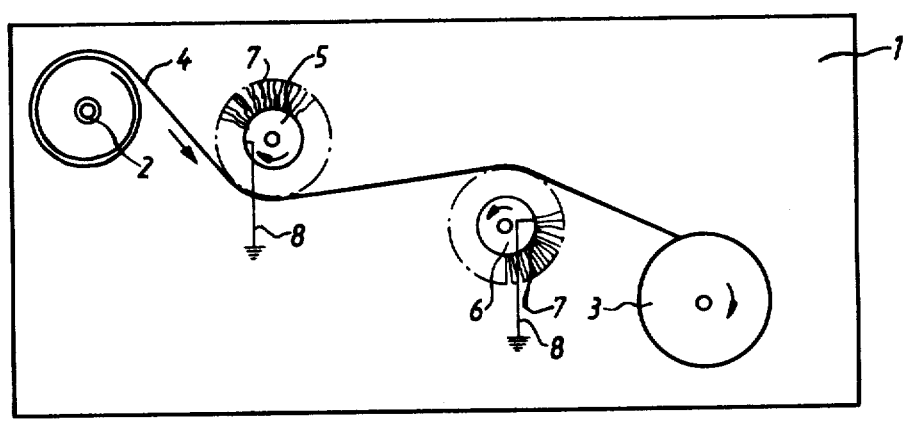
FIG. 1 is a diagrammatic side elevational view of a device embodying the invention.

The reference character 1 denotes in FIG. 1 a support, such as a mounting plate, for a supply reel 2 and a take-up reel 3 for strip-shaped photographic film 4. These reels are rotatable about their respective axes; the reel 3 may be driven (by conventional instrumentalities not specifically shown) to draw film 4 off the reel 2.

Also mounted on the plate 1, intermediate the reels 2 and 3, are two rotary brushes 5 and 6 which are so arranged that the film 4 must pass over (and be deflected by) one of them and then pass over (and be deflected by) the other of them. Thus, each of the brushes 5, 6 sweeps over one of the surfaces of the film 4 to remove dust and other contaminants. In so doing, the brushes 5, 6 frictionally engage the film 4 and this leads to the development of electrostatic charges on the film.

The periphery or surface section 7 of each brush 5, 6 is wholly or partially composed of fibers or filaments which are electrically conductive. For example, such fibers or filaments may be carbon filaments or they may be synthetic plastic filaments containing a requisite quantity of electrically conductive filler material, e.g., graphite particles, so that the entire fiber becomes conductive. Each of the brushes 5, 6 is connected to the ground, e.g., by a conductive lead 8, so as to dissipate the electrostatic charges as they develop.

It would also be possible to use conductive strips for the surface section 7 in lieu of the fibers. Such strips could be produced from synthetic plastic material (e.g., polyurethane foam sheet material) in which carbon particles or metal particles (preferably copper particles) are embedded as filler material which serves to impart the requisite electrical conductivity. Moreover, the major part of the surface section need not necessarily be made of electrically conductive material; it may be sufficient for it to be composed of some type of bristles which are found to be especially suitable for removal of dust from the data carrier 4, so long as a sufficient quantity of conductive fibers, filaments or strips is interspersed among the non-conductive bristles to assure the desired conductivity.

This latter modification has been found to be particularly well suited for the cleaning of records ("platters"), especially if the conductive material is present in the form of conductive strips as mentioned above. To clean records, the brush may for example be flat, rather than cylindrical, and be mounted in a manner known per se on a movable arm; the brush would then lightly rest upon the record surface and be entrained by the record grooves.

Figure 2:
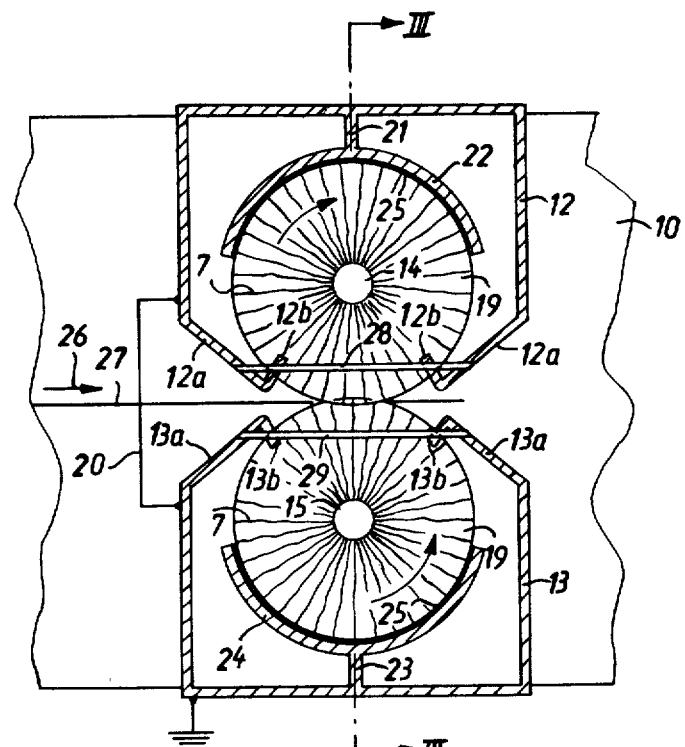
FIG. 2 is a fragmentary cross-sectional view of another embodiment of the invention.
Figure 3:
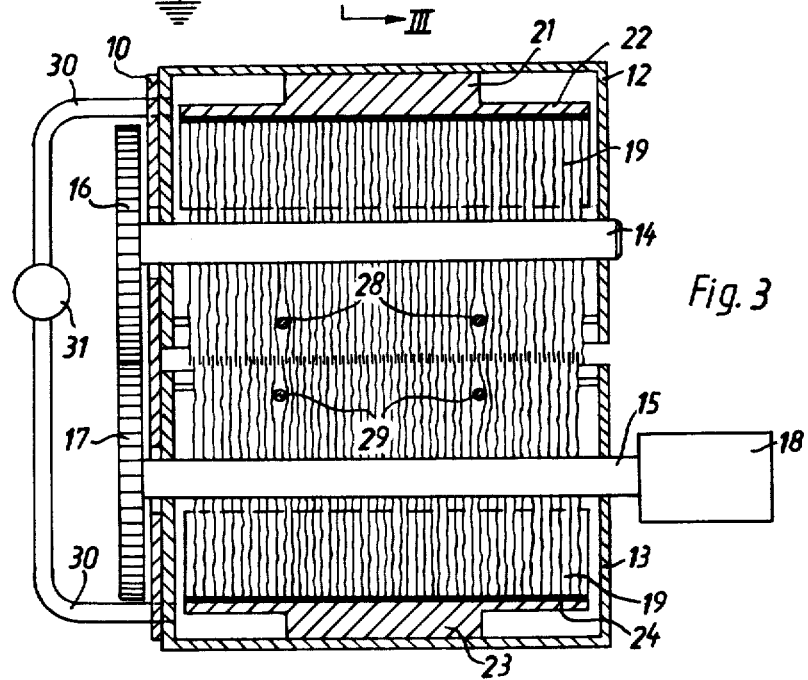
FIG. 3 is a sectional view as seen in the direction of arrows from the line III—III of FIG. 2.

In the embodiment of FIGS. 2 and 3, the support (e.g., a wall of an apparatus) is denoted by reference character 10. It carries two housings 12 and 13 both of which are electrically conductive. Shafts 14 and 15 are journalled in the sidewalls of these housings 12, 13 and are coupled for rotation in synchronism by means of mating gears 16, 17 which are located outside the housings (FIG. 3). One of the shafts, namely, the lower shaft 15, is coupled with a motor 18 to be driven thereby.

The shafts 14, 15 are actually the cores of two brushes, in that radially extending filaments, fibers or bristles 19 are mounted on these shafts 14, 15 and form the surface sections or peripheries of two rotary brushes each having a cylindrical outline. As in the preceding embodiment, the elements 19 are electrically conductive, and this may be true of all of them or else the majority of the elements 19 may constitute electrically non-conductive bristles which are, however, uniformly or substantially uniformly interspersed with a sufficient number of conductive bristles, filaments, strips or fibers to ensure the desired conductivity.

The housings 12, 13 are electrically conductive. The housing 13 is grounded and is also connected with the upper housing 12 by a conductor 20. A web 21 extends from the upper side of housing 12 and carries an electrode 22. A similar web 23 extends upwardly within and from the lower side of, the housing 13 and carries an electrode 24. The webs 21, 23 and the electrodes 22, 24 are grounded by way of the housing 13.

The electrodes 22, 24 are elongated and are curved in direction transverse to their elongation, in a generally part-cylindrical configuration. Longitudinally, the electrodes are coextensive—or almost so—with the two brushes 19. The radius of curvature of each of the electrodes is at least substantially equal to the radius of the periphery of the respective brush in order to maintain the entire inner surface of each electrode in surface-to-surface contact with the associated brush, or more specifically with the tips of the bristles or fibers of this brush. The electrodes 22, 24 surround the respective brushes—depending upon the material thereof—along arcs of 60°–180°, the range of 130°–140° being currently preferred. The electrical resistance can be lowered by coating the inner surfaces of the electrodes 22, 24 with a layer 25 of suitable material, e.g., aluminum or gold. Gold is of course preferred, since its use involves a resistance of about 3 k-ohm whereas the use of aluminum involves a resistance of about 20 k-ohm.

As the drawing shows, the housings 12, 13 are basically of square or rectangular cross sections, having sides which are open and which face each other. At these sides, the brushes including the bristles 19 project from the housings 12, 13 and the tips of the bristles slightly mesh, i.e., they form a tight nip. The data carrier 27 to be cleaned travels in the direction of arrow 26 from the left to the right (FIG. 2) so that there is an inlet side and an outlet side. To improve the guidance of the data carrier 27, the inlet sides of both housings are provided with portions or baffles 12a and 13a which are inclined toward the nip and merge into arcuate guide portions 12b, 13b directed into the bristles 19 of the brushes. The outlet sides of the housings are symmetrical with reference to the inlet sides, which is to say that they also comprise the baffles 12a and 13a which are inclined toward the nip, and the arcuate guide portions 12b, 13b. This renders it possible to have the data carrier 27 pass in the opposite direction (i.e., opposite to the direction indicated by arrow 26) through the housings, if this is desired or necessary for some reason.

At the level of the portions 12b and parallel to the direction indicated by arrow 26, two rods or bars 28 are mounted in the housing 12 and extend between the baffles 12a at the inlet and outlet sides, i.e., they electrically connect these baffles. Similar rods or bars 29 electrically connect the baffles 13a of the housing 13 and extend in parallelism with the direction indicated by arrow 26.

In operation of the device, the brushes including the bristles 19 are driven by transmission of torque from the motor 18 via the gears 16, 17; the brushes rotate in directions counter to the direction of movement of the data carrier 27 which is advanced in the direction of arrow 26 by means known per se and not specifically illustrated. The inclined baffles 12a, 13a aid in introducing the carrier 27 into the nip of the brushes. If the carrier 27 is arched, the rods or bars 28, 29 prevent it from entering in such condition, inasmuch as they tend to flatten it and thereby ensure that both major surfaces of the carrier 27 are properly brushed by the bristles 19. Friction which develops as the brushes and the carrier perform their relative movements causes contaminants (such as dust) to be separated from the carrier; at the same time, it causes the development of the undesirable electrostatic charges which, according to the invention, are immediately dissipated via bristles 19, shafts 14, 15, electrodes 22, 24 and thus to the ground.

The rods or bars 28, 29 need not be electrically conductive; it is, however, advantageous that they should be so since this permits the conductive filaments, strips or the like to additionally discharge via these rods or bars. Moreover, if they contact the data carrier 27 directly, the rods or bars 28, 29 can effect a direct dissipation of any electrostatic charge thereon.

Conduits 30 and 31 connect the housings 12, 13 with a suction generating device (not shown because known per se) so that the particles of dust and other contaminants which are separated from the data carrier by the brushes are withdrawn from the housings 12, 13.

The electrodes 22, 24 could be omitted. However, it has been found that, especially when the humidity is relatively low, the data carriers tend to become very strongly charged and that the brushes dissipate the charge too slowly, because the transitional resistance between the shafts of the brushes and their journals is too high. The problem, especially of grounding, becomes particularly severe if the journals are made of synthetic plastic material, as is becoming widely customary. The electrodes afford the desired speed-up in the dissipation of electrostatic charges since they ensure an almost complete discharge so that the individual bristles, fibers or the like reach the data carrier fully discharged during each revolution.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended with the meaning and range of equivalence of the claims.

We claim:

1. A device for cleaning data carriers, particularly photographic films, records, magnetic tapes and the like, comprising:
   (a) a brush for cleaning a data carrier, said brush including separate first and second cleaning elements, and said first elements being electrically conductive to thereby permit electrostatic charge on the data carrier to be neutralized while the data carrier is cleaned by said first elements, said second elements having a cleaning action superior to that of said first elements so as to enhance the cleaning effect obtained with the latter; and
   (b) grounding means connecting said elements to ground to thereby enable electrostatic charge on the data carrier to be dissipated.

2. The device of claim 1, wherein said first elements are electrically conductive filaments.

3. The device of claim 2, wherein said filaments are carbon fibers.

4. The device of claim 2, wherein said filaments consist of synthetic plastic material with an embedded electrically conductive filler substance.

5. The device of claim 4, wherein said filler substance consists of carbon particles.

6. The device of claim 4, wherein said filler substance consists of metallic particles.

7. The device of claim 6, wherein said metallic particles consist of copper.

8. The device of claim 1, wherein said first elements are electrically conductive strips.

9. The device of claim 1, wherein said second elements are interspersed among said first elements.

10. The device of claim 9, wherein said second elements comprise substantially non-conductive bristles.

11. The device of claim 10, wherein said first elements are electrically conductive filaments.

12. The device of claim 10, wherein said first elements are electrically conductive strips.

13. The device of claim 1, wherein the electrical conductivity of said second elements is lower than that of said first elements.

14. The device of claim 1, wherein said first elements are electrically conductive strips of polyurethane foam with embedded electrically conductive carbon and/or metal particles.

15. A device for cleaning data carriers, particularly photographic films, records, magnetic tapes and the like, comprising:
   (a) an electrically conductive brush for cleaning a data carrier; and
   (b) grounding means connecting said brush to ground so as to enable electrostatic charge on the data carrier to be dissipated, said grounding means including a collector electrode having a surface portion which contacts a peripheral portion of said brush, and said surface portion substantially conforming to the shape of said peripheral portion to enchance the contact between said surface portion and said peripheral portion and thereby improve the dissipation of electrostatic charge generated on the data carrier.

16. The device of claim 15, further comprising an electrically conductive housing for said electrode and said brush, at least the major portion of said brush being disposed in said housing.

17. The device of claim 15, wherein said electrode extends along said brush and the length of said electrode substantially equals that of said brush.

18. The device of claim 15, comprising a coating of gold on said surface portion of said electrode.

19. The device of claim 15, has a surface contacting said brush and further comprising a coating of aluminum on said surface portion of said electrode.

20. The device of claim 15, further comprising an electrically conductive housing for said electrode and said brush confining at least the major portion of said brush, and means for withdrawing from said housing contaminants which are separated from the data carrier by said brush.

21. A device for cleaning data carriers such as photographic films, records, magnetic tapes and the like which tend to undergo frictional electrostatic charging comprising at least one elongated brush having a surface section adapted to engage and clean a data carrier in response to relative movement between said brush and the data carrier, said surface section including at least some portions which consist of electrically conductive material; means for grounding said portions so as to dissipate electrostatic charge on the data carrier via said portions, said grounding means including a collector electrode which has a length substantially equaling the length of said brush and is in surface-to-surface contact with said surface section thereof; and an electrically conductive housing for said electrode and said brush connected with said electrode in electrically conductive relationship, at least the major portion of said brush being disposed in said housing.

22. A device for cleaning data carriers such as photographic films, records, magnetic tapes and the like which tend to undergo frictional electrostatic charging comprising at least one elongated brush of cylindrical outline having a surface section adapted to engage and clean a data carrier in response to relative movement between said brush and the data carrier, said surface section including at least some portions which consist of electrically conductive material; and means for grounding said portions so as to dissipate electrostatic charge on the data carrier via said portions, said grounding means including a collector electrode which has a length substantially equaling the length of said brush and is in surface-to-surface contact with said surface section thereof, and said electrode being arcuate transversely of its elongation and having a radius which at least substantially equals the radius of the periphery of said brush.

23. A device for cleaning data carriers such as photographic films, records, magnetic tapes and the like which tend to undergo frictional electrostatic charging comprising at least one elongated brush of cylindrical outline having a surface section adapted to engage and clean a data carrier in response to relative movement between said brush and the data carrier, said surface section including at least some portions which consist of electrically conductive material; and means for grounding said portions so as to dissipate electrostatic charge on the data carrier via said portions, said grounding means including a collector electrode which has a length substantially equaling the length of said brush and is in surface-to-surface contact with said surface section thereof, and said electrode being arcuate and surrounding said brush along an arc of 60° to 180°.

24. The device of claim 23, wherein said electrode surrounds said brush along an arc of 130°-140°.

25. A device for cleaning data carriers such as photographic films, records, magnetic tapes and the like which tend to undergo frictional electrostatic charging comprising at least one elongated brush having a surface section adapted to engage and clean a data carrier in response to relative movement between said brush and the data carrier, said surface section including at least some portions which consist of electrically conductive material; means for grounding said portions so as to dissipate electrostatic charge on the data carrier via said portions, said grounding means including a collector electrode which has a length substantially equaling the length of said brush and is in surface-to-surface contact with said surface section thereof; and an additional brush similar to and located opposite said one brush and defining therewith a nip through which the data carrier is compelled to pass.

26. The device of claim 25, further comprising a pair of housings each surrounding one of said brushes except in the region of said nip, each of said housings having guide faces which are inclined in a direction toward said nip.

27. The device of claim 26, wherein the data carrier is arranged to pass through said nip along a predetermined path and said inclined guide faces are adjacent to said path upstream and downstream of said nip, and further comprising electrically conductive rods connecting the inclined upstream and downstream guide faces of each of said housings.

* * * * *